US 8,370,919 B2

(12) United States Patent
Abzarian et al.

(10) Patent No.: US 8,370,919 B2
(45) Date of Patent: Feb. 5, 2013

(54) HOST FIREWALL INTEGRATION WITH EDGE TRAVERSAL TECHNOLOGY (75) Inventors: David Abzarian, Kirkland, WA (US);
Michael R. Surkan, Bellevue, WA (US);
Salahuddin C. J. Khan, Redmond, WA (US); Amit A. Sehgal, Kirkland, WA (US); Eran Yariv, Redmond, WA (US); Emanuel Paleologu, Kirkland, WA (US); Gerardo Diaz Cuellar, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 11/821,839

(22) Filed: Jun. 26, 2007

(65) Prior Publication Data

US 2009/0007251 A1    Jan. 1, 2009

(51) Int. Cl.
*H04L 29/06* (2006.01)
(52) U.S. Cl. ........................................ 726/13
(58) Field of Classification Search ............... 726/11–15
See application file for complete search history.

(56) References Cited

U.S. PATENT DOCUMENTS

| 6,484,261 | B1 | 11/2002 | Wiegel |
| 7,028,336 | B2 | 4/2006 | Wesinger, Jr. et al. |
| 7,072,350 | B2 | 7/2006 | Dooley et al. |
| 7,114,008 | B2 | 9/2006 | Jungck et al. |
| 7,124,173 | B2 | 10/2006 | Moriarty |
| 7,139,837 | B1 | 11/2006 | Parekh et al. |
| 7,177,932 | B2 * | 2/2007 | Pitsos ........................... 709/225 |
| 7,466,652 | B2 | 12/2008 | Lau et al. |
| 7,707,294 | B2 | 4/2010 | Abzarian et al. |
| 7,881,440 | B2 | 2/2011 | Castillo et al. |
| 8,028,076 | B2 | 9/2011 | Abzarian et al. |
| 2003/0072318 | A1 | 4/2003 | Lam et al. |
| 2003/0122830 | A1 | 7/2003 | Yap |
| 2004/0030776 | A1 * | 2/2004 | Cantrell et al. ............... 709/224 |
| 2004/0117653 | A1 * | 6/2004 | Shapira et al. ................ 713/201 |
| 2004/0128554 | A1 | 7/2004 | Maher, III et al. |
| 2004/0187028 | A1 | 9/2004 | Perkins et al. |
| 2005/0005165 | A1 | 1/2005 | Morgan et al. |
| 2005/0015752 | A1 | 1/2005 | Alpern et al. |
| 2005/0076234 | A1 | 4/2005 | Krtolica et al. |

(Continued)

FOREIGN PATENT DOCUMENTS

| EP | 1739897 | 1/2007 |
| EP | 1744500 | 1/2007 |

OTHER PUBLICATIONS

"Changes to IPv6 in Windows Vista and Windows Server "Longhorn"", The Cable Guy—Oct. 2005, pp. 1-9.

(Continued)

*Primary Examiner* — Gilberto Barron, Jr.
*Assistant Examiner* — Simon Kanaan (57) ABSTRACT

A host firewall can determine and consider whether unsolicited traffic is inbound from beyond the edge of the network and allow or block such traffic based at least in part upon this characteristic. In one implementation, an edge traversal parameter can be set on a host firewall rule, which typically includes other parameters such as port, protocol, etc. If the unsolicited traffic received via an edge traversal interface matches a host firewall rule that has the edge traversal criterion, then the firewall does not block the traffic. On the other hand, if the unsolicited traffic received via an edge traversal interface fails to satisfy the edge traversal criterion on any firewall rule, then the firewall blocks the traffic.

20 Claims, 5 Drawing Sheets

U.S. PATENT DOCUMENTS

| | | |
|---|---|---|
| 2005/0125532 A1 | 6/2005 | Kimchi |
| 2005/0138413 A1 | 6/2005 | Lippmann et al. |
| 2005/0198499 A1 | 9/2005 | Salapaka et al. |
| 2005/0210292 A1 | 9/2005 | Adams et al. |
| 2006/0021001 A1 | 1/2006 | Giles et al. |
| 2006/0041935 A1 | 2/2006 | Conley et al. |
| 2006/0085548 A1 | 4/2006 | Maher et al. |
| 2006/0174337 A1* | 8/2006 | Bernoth .................. 726/11 |
| 2006/0195896 A1 | 8/2006 | Fulp et al. |
| 2006/0288103 A1 | 12/2006 | Gobara et al. |
| 2007/0022289 A1 | 1/2007 | Alt et al. |
| 2007/0171835 A1 | 7/2007 | Gobara et al. |
| 2007/0255861 A1 | 11/2007 | Kain et al. |
| 2008/0141366 A1 | 6/2008 | Cross et al. |
| 2008/0225839 A1 | 9/2008 | Gobara et al. |
| 2009/0064304 A1 | 3/2009 | Cohen et al. |

OTHER PUBLICATIONS

"SIPassure", Date: 2007, Datamation, pp. 1-4.
"Using IPv6 and Teredo", Microsoft Technet, pp. 1-5.
"Teredo: Tunneling IPv6 over UDP through Network Address Translations", C. Huitema, The Internet Society (2006), Feb. 2006.
"Teredo Overview", Reprinted from the Internet at: http://technet.microsoft.com/en-us/library/bb457011.aspx, Published Jan. 2003.

* cited by examiner

HOST FIREWALL INTEGRATION WITH EDGE TRAVERSAL TECHNOLOGY

BACKGROUND

A computer host may execute a host firewall application to protect itself from incursions by malicious entities via a communications network (e.g., the Internet). Host firewalls can provide a considerable amount of security from such threats by controlling the traffic passing between the host and other network-connected entities within different zones of trust. However, many hosts are connected within a local network to certain entry points to the local network, such as a network address translation (NAT) device or another firewall application or device, positioned at an "edge" of the local network. As such, a host firewall may be configured to block unsolicited traffic to prevent attacks from outside the network through these entry points.

Certain edge traversal technologies have emerged to allow legitimate unsolicited inbound traffic to traverse edge entities, such as NATs and firewalls. One particular implementation of such technology is an edge traversal service designed to send UDP (uniform data packet) "bubbles" from the host to artificially maintain state on edge devices in order to allow unsolicited UDP traffic to traverse back through said edge devices. The service utilizes a virtual adapter on the host system that has a service-specific IPv6 address. The service-specific address is obtained from an edge traversal server outside the local network that can compute the host's service-specific address based on the external IPv4 address of the NAT or other edge security entity and the specific port being used for that host on the NAT or other edge security entity. In summary, an edge traversal service allows a host to receive unsolicited, inbound traffic through its local network edge.

However, edge traversal can expose the host, and therefore the local network, to undesirable security risks. Existing firewall rules that allow unsolicited traffic for any application or service are IP-version agnostic and unaware of edge traversal technologies. Therefore, any host firewall rule that allows unsolicited traffic to an application or service would inadvertently allow that traffic to come over any interface, including those interfaces specifically designed for edge traversal. For example, if edge traversal service is enabled for a particular host, then any application having a host firewall rule allowing unsolicited traffic would be exposed to unsolicited traffic from outside its network via the edge traversal service.

SUMMARY

Implementations described and claimed herein address the foregoing problems by providing a mechanism for a host firewall to determine and consider whether unsolicited traffic is inbound from beyond the edge of the network and allow or block such traffic based at least in part upon this characteristic. In one implementation, an edge traversal parameter can be set on a host firewall rule, which typically includes other parameters such as port, protocol, etc. If the unsolicited traffic received via an edge traversal interface matches a host firewall rule that has the edge traversal criterion, then the firewall does not block the traffic. On the other hand, if the unsolicited traffic received via an edge traversal interface fails to satisfy the edge traversal criterion on any firewall rule, then the firewall blocks the traffic.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTIONS

Figure 1:
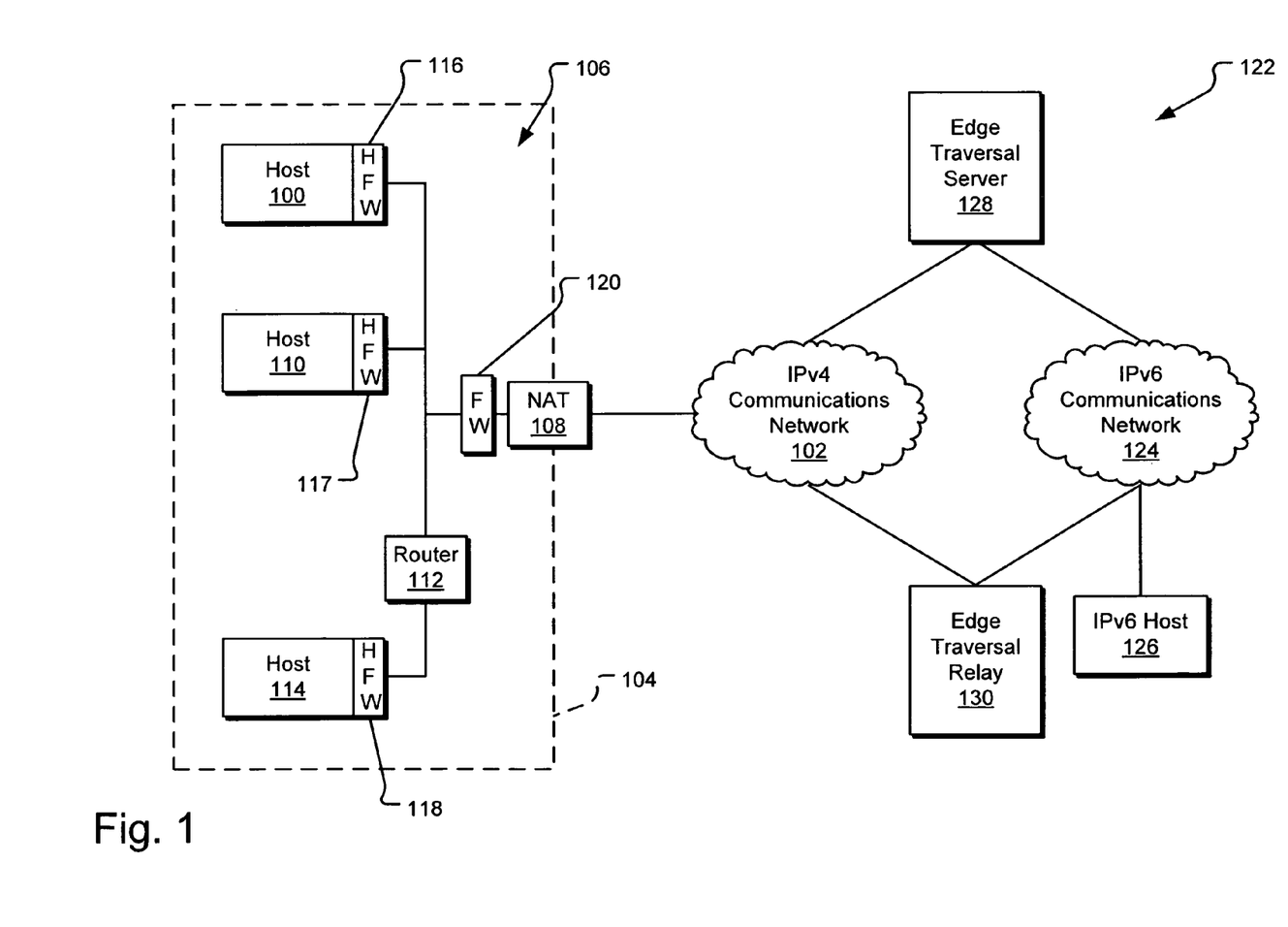
FIG. 1 illustrates an example host computer connected to a communications network beyond the edge of its local network.

FIG. 1 illustrates an example host computer 100 connected to an IPv4 communications network 102 beyond the edge 104 of its IPv4 local network 106. A NAT device 108 represents an edge device that provides an entry point for traffic into the local network 106. Other examples of edge devices may include without limitation routers, firewalls, intrusion protection systems, intrusion detection systems, VPN gateways, edge switches, edge translators, etc. The local network 106 also includes other computing and communications entities, including without limitation another host computer 110, a router 112, and another host computer 114.

The host 100 includes a host firewall (HFW) 116 that is configured control traffic between the host 100 and other entities, such as computer 112. The hosts 110 and 114 are also shown with host firewalls 117 and 118, respectively. The host firewall 116 filters (e.g., allows or blocks) certain traffic transmitted to or from the host 100 according to specified firewall rules. In one implementation, a default firewall rule may block all inbound traffic. Given this default, one or more firewall rules can be specified as exceptions to the default in order to allow certain traffic to pass through the host firewall. For example, a firewall rule may allow all inbound traffic received by the host 100 and destined to a service Foo executing on the host 100 via TCP port 321. Other exceptions may also be specified. The local network 106 also includes an enterprise firewall (FW) 120, which is tasked with controlling traffic between the local network 106 and the IPv4 communications network 102.

The local network 106 and the IPv4 communications network 102 are connected within an aggregate network 122, which also includes an IPv6 communications network 124 and an IPv6 host 126 and may include many other host computers, communication entities, security entities, etc. An edge traversal technology has been implemented within the aggregate network 122 to allow unsolicited inbound traffic to traverse the edge devices of the local network 106, such as the NAT 108 and the enterprise firewall 120. In one implementation, the host 100 represents an edge traversal client that supports an edge traversal tunneling protocol through which packets are tunneled from other hosts outside the local network 106. In this manner, the host 100 supports IPv6 addressing from behind the NAT 108 in order to access the IPv6 communications network 124 and the IPv6 host 126.

The host 100 communicates with an edge traversal server 128 to obtain an address prefix from which a valid IPv6 address is configured or to help initiate communication with other clients or hosts on the IPv6 communications network 124. The edge traversal server 128 is an IPv6/IPv4 node that is connected to both the IPv4 communications network 102 and the IPv6 communications network 124 and supports an edge traversal tunneling interface over which packets are received. In one implementation, the edge traversal server 128 assigns the host 100 an IPv6 address that incorporates its IPv4 address and the port through which it is communicating. An edge traversal relay 130 serves as a remote end of an edge traversal tunnel, forwarding data received on behalf of the edge traversal clients it serves.

Through these or similar mechanisms, the aggregate network 122, and particularly the host 100, can support edge traversal technology. If the edge security devices on the local network (e.g., the edge firewall 120) allow unsolicited traffic to an edge traversal service of hosts in the local network 106, then the host firewall 116 will be able to make the determination about whether to pass the traffic to a target application or service within the host 100. In order for the host 100 to securely control such edge traversal traffic, the traffic is evaluated against one or more firewall rules of the host firewall 116. In one implementation, the host firewall 116 and an edge traversal service within the host 100 determine whether the traffic has traversed an edge of the local network, generate an edge traversal context for the traffic and evaluates the traffic, including the edge traversal context, against the applicable firewall rules to determine whether to allow traffic to be received by target in the host 100. The firewall rule includes an edge traversal criterion that influences whether the traffic is blocked or allowed.

Figure 2:
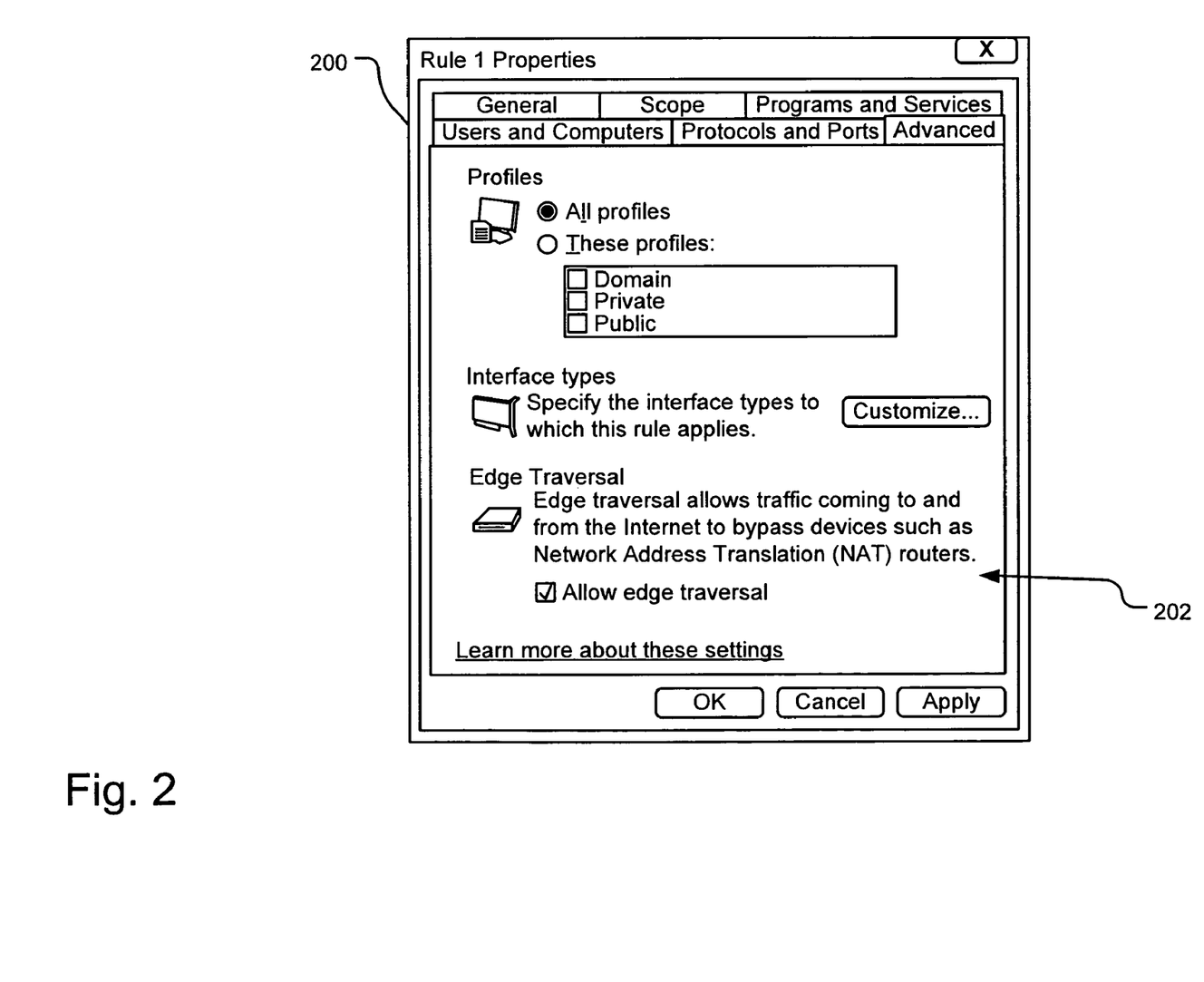
FIG. 2 illustrates a user interface for configuring an example host firewall rule that allows edge traversal.

FIG. 2 illustrates a user interface for configuring an example host firewall rule that allows edge traversal. The dialog box 200 allows a user to specify a firewall rule ("Rule 1") of a host firewall. Firewall rules can be set to apply to specific interface types supported by the host, such as Wireless 802.11, Ethernet, SLIP, PPP, ISDN, etc. Other firewall rule criteria may include specified programs and services that are the target of the traffic, specified users, hosts, ports, protocols, scope, etc. The users settings controls which remote users are permitted or denied from sending/receiving traffic to/from the local host. The hosts settings control which remote computers (i.e., "hosts") may or may not communicate with the local host. The ports settings specify which local and/or remote TCP or UDP ports are permitted/denied for the local host. The scope settings specify one or more ranges of addresses, via a subnet or simple address range, to restrict a rule to a set of devices within the specified range.

In the dialog box section 202, the user can specify whether to allow edge traversal traffic for this rule. If "Allow edge traversal" is checked and all other firewall criteria of a rule are satisfied by certain traffic, then the host firewall will pass the traffic even if the traffic is determined to have traversed an edge of the host's local network. In contrast, if "Allow edge traversal" is not checked, then the host firewall will block traffic that otherwise satisfies the firewall criteria of the rule if the traffic is determined to have traversed an edge of the host's local network (and the traffic fails to satisfy any other "allow" firewall rule).

Through the user interface of FIG. 2 or some other user interface, a user can specify the firewall rules to be applied on a specified host. An example set of firewall rules incorporating an edge traversal criterion is shown below (an asterisk represents a wildcard matching any context for a given condition):

TABLE 1

Example Firewall Rules

| Rule Number | Action | Direction | Protocol | Port | Scope | Target | Edge Traversal |
|---|---|---|---|---|---|---|---|
| 1 | Allow | Inbound | TCP | 80 | * | Foo | Yes |
| 2 | Allow | Inbound | UDP | 139 | * | Bar | No |
| 3 | Allow | Inbound | UDP | 3666 | * | ETS | Yes |
| 4 | Block (Default) | * | * | * | * | * | N/A |

The Action field indicates the host firewall's reaction to traffic satisfying the specified firewall rule (e.g., allow or block the traffic). For example, if the traffic has traversed an edge, is inbound over TCP Port 80, and is directed at target Foo, then the host firewall will allow the traffic to pass to target Foo because the traffic satisfies Rule 1. In one implementation, if the traffic does not satisfy any exception firewall rule (e.g., the first three in Table 1), then it will satisfy the Default firewall and the host firewall will block the traffic. The Direction field identifies whether the traffic is Inbound or Outbound. The Protocol field indicates whether the protocol is TCP, UDP, GRE, PGM, ICMPv4, ICMPv6, etc. The Port field indicates the number of the communications port to which the traffic is directed. The Scope field specifies one or more ranges of addresses, via a subnet or simple address range, to restrict a rule to a set of devices within the specified range. The asterisk in the Scope fields of the rules indicates a wildcard. The Target field identifies the application or service on the host to which the traffic is directed. The Edge Traversal field identifies whether edge traversal by the traffic is permitted (e.g., through a virtual edge traversal interface - see interface 314 of FIG. 3). If all of the host firewall criteria of an individual rule match the characteristics of the traffic, then the host firewall blocks or allows the traffic, according to the value in the Action field.

Another example method of controlling edge traversal through the host firewall on a per-rule basis may be accomplished through an extension to the firewall schema. An example of the firewall rule schema for Rule 1 of Table 1 is:

Action=Allow|Active=TRUE|Dir=In|Protocol=6|LPort=321|App=
%ProgramFiles%\foo.exe|Edge=TRUE|Name=@wfapi.dll, -
29001|Desc=@wfapi.dll, -29001|EmbedCtxt=@wfapi.dll,-29000|"

where Action designates the Action field in Table 1, Active designates whether the rule is to be enforced, Dir designates the Direction field in Table 1, Protocol designates the Protocol field of Table 1, LPort designates the Port field in Table 1, and App designates the Target fields in Table 1. Name specifies the name of the firewall rule, Desc specifies the description of the firewall rule, and EmbedCtxt specifies which firewall rule group the rule is member of.

Yet another example method of controlling edge traversal through the host firewall may be accomplished via an advanced firewall netsh context. In one implementation, the following command may be executed to permit edge traversal for a given rule named "Rule 1":

```
netsh advfirewall firewall set rule name="Rule 1" new edge=Yes
```

In contrast, the following command may be executed to not allow edge traversal for a "Rule 1":

```
netsh advfirewall firewall set rule name="Rule 1" new edge=No
```

Figure 3:
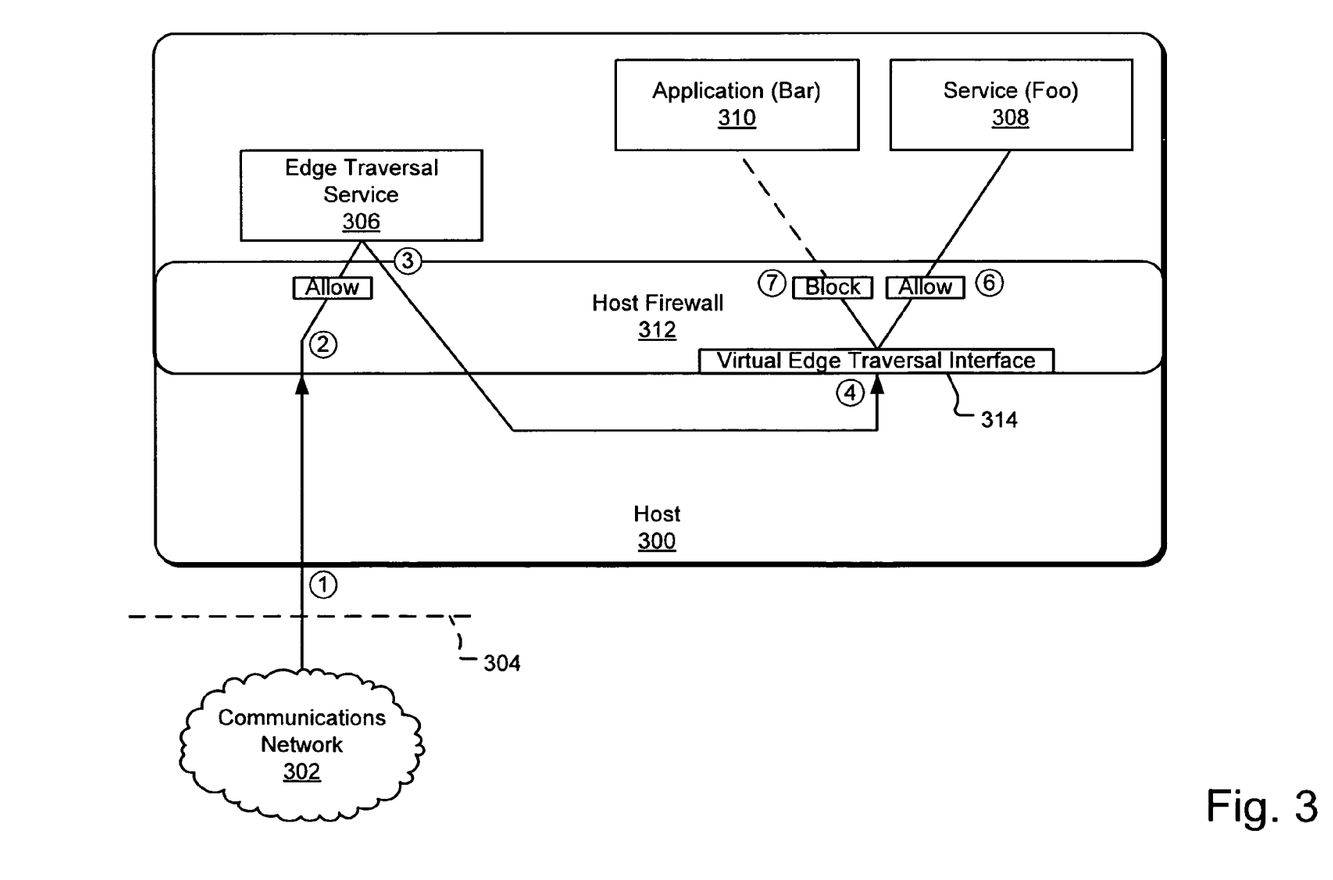
FIG. 3 illustrates an example host connected to a communications network beyond the edge of its local network.

FIG. 3 illustrates an example host 300 connected to a communications network 302 beyond the edge 304 of its local network (not shown). In step 1, identified by the circle labeled "1" in FIG. 3, two inbound packets transmitted from beyond the edge 304 are received on the physical interface of the host system, destined for the edge traversal service (ETS) 306. In one implementation, these packets traversed the local network edge 304, each packet having a payload encapsulated in a UDP packet destined through Port 3666. Each payload is destined through a specified port for a target in the host 300. Packets P1 and P2 are destined through UDP Port 3666 for an edge traversal service (ETS). The payload of Packet P1 is destined for a service 308 named "Foo" through a TCP port 80, the payload of Packet P2 is destined for an application 310 named "Bar" through a UDP port 139, and both packets have traversed the edge 304 of the local network to reach the host 300. Collectively, such information identifies at least a portion of the traffic context of each packet or payload.

In step 2, identified by the circle labeled "2" in FIG. 3, the host firewall 312 intercepts P1 and P2, determines their contexts, and evaluates them against the firewall rules attributed to the host firewall 312. For this illustration, the firewall rules from Table 1 are applied. Both packets satisfy Rule 3 and therefore are allowed to pass through to the edge traversal service 306.

In step 3, identified by the circle labeled "3" in FIG. 3, the edge traversal service 306 receives the packets and decapsulates them in order to gain access to their payloads. The edge traversal service 306 then re-injects the payloads into the host firewall 312 through a virtual edge traversal interface 314 in step 4, identified by the circle labeled "4" in FIG. 3. The re-injection allows the host firewall 312 to authorize the decapsulated payloads (as opposed to the originally received packets). In step 4, the host firewall 312 determines the traffic context for both payloads, including their edge traversal contexts, and evaluates each packet's context against the firewall rules of Table 1. The context of packet P1's payload matches Rule 1, including the Edge Traversal criterion. Accordingly, in step 6, identified by the circle labeled "6" in FIG. 3, the payload of packet P1 is allowed to pass to the service Foo in the host 300. In contrast, in step 7, identified by the circle labeled "7" in FIG. 3, the context of packet P2's payload matches all of Rule 2 except for the Edge Traversal criterion, and further fails to match Rules 1 and 3. Accordingly, the host firewall 312 blocks the payload of packet P2 from passing to application Bar in the host 300, in accordance with the default firewall Rule 4.

Figure 4:
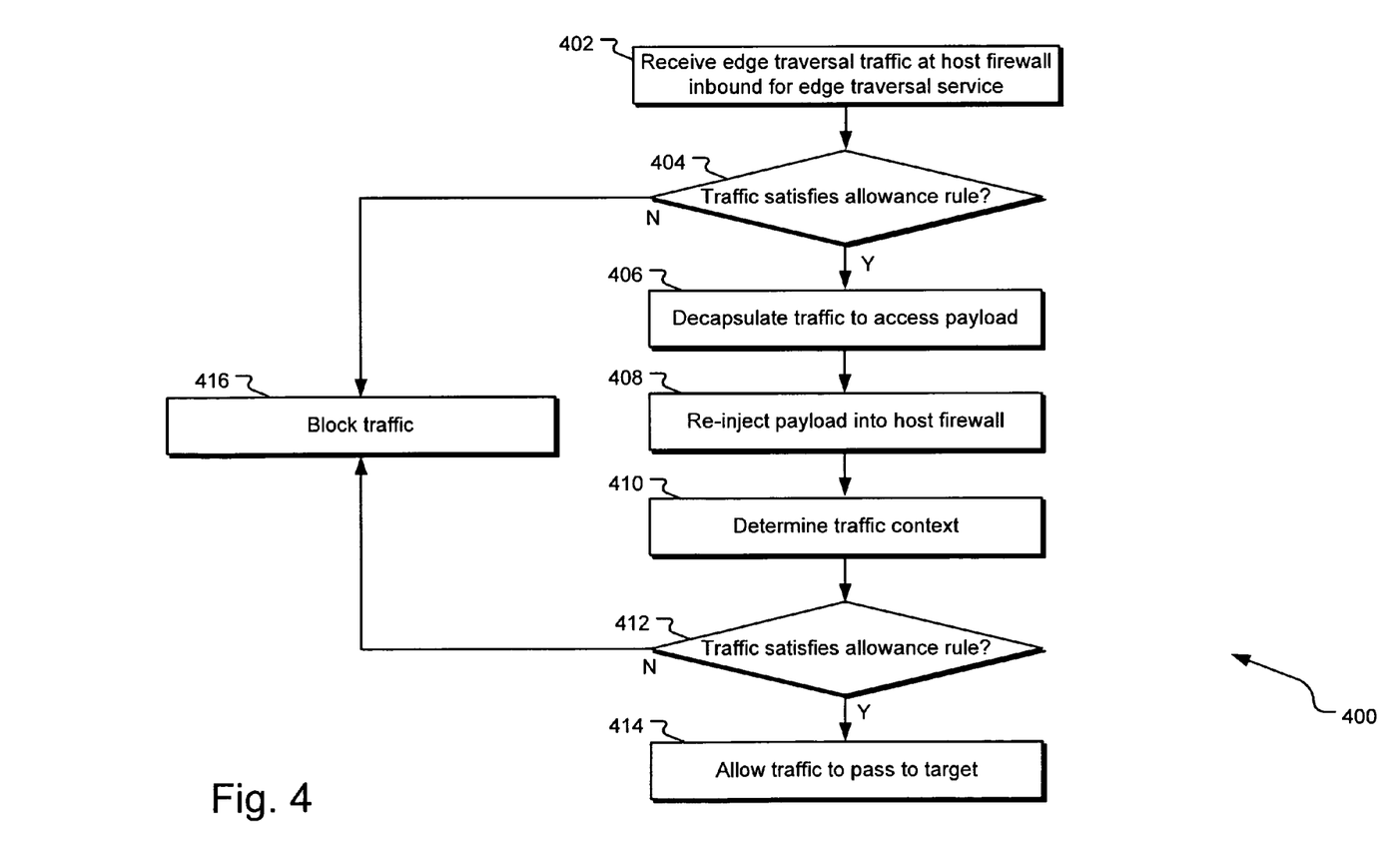
FIG. 4 illustrates example operations of a host firewall configured with a host firewall rule that authorizes edge traversal traffic.

FIG. 4 illustrates example operations 400 of a host firewall configured with a host firewall rule that authorizes edge traversal traffic. A receiving operation 402 receives edge traversal traffic at the host firewall of a host. The edge traversal traffic is inbound and destined for an edge traversal service of the host. A firewall operation 404 determines the traffic context, including the edge traversal context of the inbound traffic. In one implementation, the edge traversal context of the inbound traffic is determined by inspecting the IANA interface type and tunnel type against which the inbound traffic is classified. For example, if IF_TYPE=TUNNEL" and TUNNEL_TYPE="Teredo", the edge traversal context is designated as indicating that the traffic traversed the edge of the network (Note: Teredo represents a type of edge traversal technology). It should be understood that other methods of determining the edge traversal context may also be employed, including without limitation modifying (at the sender) a header of the encapsulated traffic (e.g., by using an unused bit) to indicate that the traffic is to be sent/received via edge traversal. In this example with the modified header, an additional security check can be performed on the receiver side to verify that any decapsulated traffic to be forwarded through re-injection has an appropriately modified header.

The firewall operation 404 also evaluates the context of the inbound traffic against one or more firewall rules to determine whether the inbound traffic should be allowed to pass to the edge traversal service of the host. In one implementation, such firewall rules include an edge traversal criterion against which the edge traversal context of the inbound traffic is tested. If the inbound traffic context does not satisfy a rule that allows the traffic to pass to the edge traversal service, the host firewall blocks the inbound traffic in a blocking operation 416. If the inbound traffic is allowed to pass, the inbound traffic is passed to the edge traversal service, which decapsulates the traffic to access the traffic payload in an operation 406. An injection operation 408 re-injects the payload into the host firewall, such as via a virtual edge traversal interface.

Another firewall operation 410 determines the traffic context, including the edge traversal context of the re-injected traffic, and an operation 412 evaluates the context of the re-injected traffic against one or more firewall rules to determine whether the re-injected traffic should be allowed to pass to a designated target in the host. In one implementation, such firewall rules include an edge traversal criterion against which the edge traversal context of the re-injected traffic is tested. If the re-injected traffic does not satisfy a firewall rule that allows the traffic to pass to its target in the host, the host firewall blocks the re-injected traffic in a blocking operation 416. If the re-injected traffic is allowed to pass, the host firewall passes the re-injected traffic to its target in an allowance operation 414.

Figure 5:
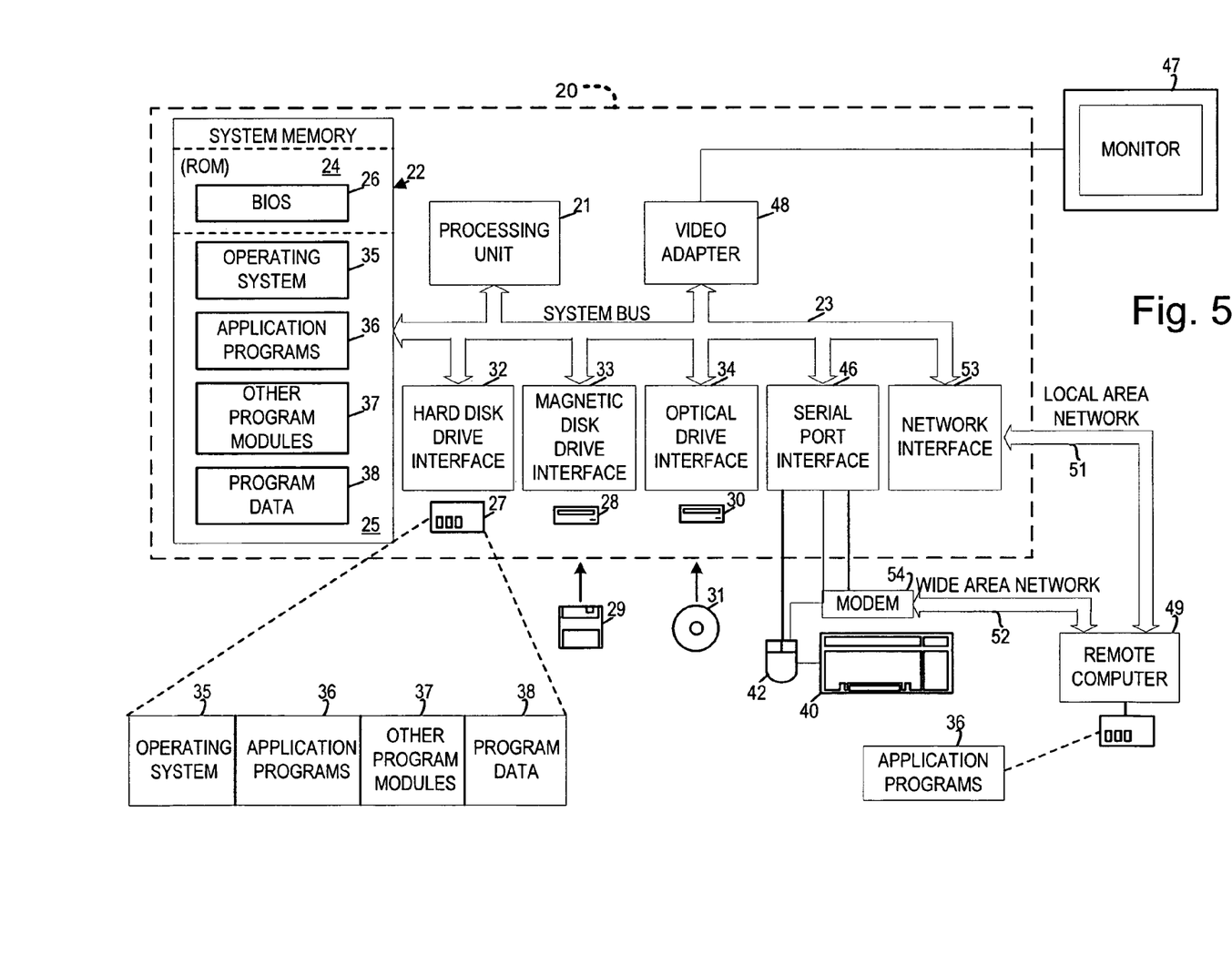
FIG. 5 illustrates an example system that may be useful in implementing the described technology.

The example hardware and operating environment of FIG. 5 for implementing the invention includes a computing device, such as general purpose computing device in the form of a gaming console or computer 20, a mobile telephone, a personal data assistant (PDA), a set top box, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are example and other means of and communications devices for establishing a communications link between the computers may be used.

In an example implementation, a host firewall module, an edge traversal service module, a virtual edge traversal interface, target modules, and other modules may be embodied by instructions stored in memory 22 and/or storage devices 29 or 31 and processed by the processing unit 21. A host firewall rules, traffic contexts, packets, and other data may be stored in memory 22 and/or storage devices 29 or 31 as persistent datastores.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of example embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of authorizing traffic received at a host firewall of a host within a local network, the method comprising:

receiving traffic transmitted from beyond an edge of the local network, the traffic destined for an edge traversal service within the host, the traffic including a payload destined for a target within host;

authorizing the traffic to pass through the host firewall to the edge traversal service within the host, if the traffic is permitted by a firewall rule for the edge traversal service;

receiving the payload at a virtual edge traversal interface of the host firewall, the payload being re-injected into the host firewall by the edge traversal service;

evaluating the re-injected payload against a firewall rule for the target, the firewall rule for the target including an edge traversal criterion identifying whether edge traversal is permitted and other firewall criteria identifying characteristics of permitted traffic; and authorizing the re-injected payload to pass through the host firewall to the target within the host, if the edge traversal criterion of the firewall rule permits edge traversal via the virtual edge traversal interface of the host firewall and the re-injected payload satisfies the other firewall criteria of the firewall rule for the target.

2. The method of claim 1, further comprising:

blocking the re-injected payload from passing through the host firewall to the target, if the edge traversal criterion for the target does not permit edge traversal and the payload fails to satisfy all other firewall criteria of any firewall rule that includes an edge traversal criterion permitting edge traversal via the virtual edge traversal interface of the host firewall.

3. The method of claim 1, further comprising:

inspecting an Internet Assigned Numbers Authority (IANA) interface type and a tunnel type against which the traffic is classified to determine an edge traversal context for the traffic.

4. The method of claim 1 further comprising:

determining a context of the traffic, including an edge traversal context for the traffic, a protocol of the traffic, and a communications port to which the traffic is directed; and evaluating the context of the traffic against the firewall rule for the edge traversal service.

5. The method of claim 1 wherein the traffic is received inbound by the host through an entry point of the local network.

6. The method of claim 1 wherein the edge traversal service allows the host to receive unsolicited traffic through the edge of the local network.

7. The method of claim 1, further comprising:

determining a context of the re-injected payload received at the virtual edge traversal interface of the host firewall from the edge traversal service, the context of the re-injected payload including an edge traversal context for the re-injected payload.

8. The method of claim 1, further comprising:

receiving, at the host firewall, traffic including a packet that traversed the edge of the local network and that is destined for the edge traversal service of the host, the packet encapsulating the payload destined for the target within the host; and receiving, at the virtual edge traversal interface of the host firewall, the payload after being decapsulated from the packet by the edge traversal service of the host.

9. The method of claim 1, further comprising:

determining an edge traversal context for the re-injected payload; and evaluating the edge traversal context for the re-injected payload against the edge traversal criterion of the firewall rule for the target.

10. The method of claim 1, further comprising:

passing the re-injected payload to the target, wherein the edge traversal criterion of the firewall rule for the target permits edge traversal via the virtual edge traversal interface of the host firewall, and wherein the re-injected payload satisfies the other firewall criteria of the firewall rule for the target.

11. A computer-readable storage medium storing computer-executable instructions that, when executed, cause a computing device to perform a computer process comprising:

receiving traffic at a host firewall of a host within a local network, the traffic transmitted from beyond an edge of the local network and destined for an edge traversal service within the host, the traffic including a payload destined for a target within host;

authorizing the traffic to pass through the host firewall to the edge traversal service within the host, if the traffic is permitted by a firewall rule for the edge traversal service;

receiving the payload at a virtual edge traversal interface of the host firewall, the payload being re-injected into the host firewall by the edge traversal service;

evaluating the re-injected payload against a firewall rule for the target, the firewall rule for the target including an edge traversal criterion identifying whether edge traversal is permitted and other firewall criteria identifying characteristics of permitted traffic; and authorizing the re-injected payload to pass through the host firewall to the target, if the edge traversal criterion of the firewall rule permits edge traversal via the virtual edge traversal interface of the host firewall and the re-injected payload satisfies the other firewall criteria of the firewall rule for the target.

12. The computer-readable storage medium of claim 11, wherein the computer process further comprises:

blocking the re-injected payload from passing through the host firewall to the target, if the edge traversal criterion for the target does not permit edge traversal and the payload fails to satisfy all other firewall criteria of any firewall rule that includes an edge traversal criterion permitting edge traversal via the virtual edge traversal interface of the host firewall.

13. The computer-readable storage medium of claim 11, wherein the computer process further comprises:

inspecting an Internet Assigned Numbers Authority (IANA) interface type and a tunnel type against which the traffic is classified to determine an edge traversal context for the traffic.

14. The computer-readable storage medium of claim 11, wherein the computer process further comprises:

receiving, at the host firewall, traffic including a packet that traversed the edge of the local network and that is destined for the edge traversal service of the host, the packet encapsulating the payload destined for the target within the host; and receiving, at the virtual edge traversal interface of the host firewall, the payload after being decapsulated from the packet by the edge traversal service of the host.

15. The computer-readable storage medium of claim 11, wherein the computer process further comprises:

determining an edge traversal context for the re-injected payload; and evaluating the edge traversal context for the re-injected payload against the edge traversal criterion of the firewall rule for the target.

16. The computer-readable storage medium of claim 11, wherein the computer process further comprises:

passing the re-injected payload to the target, wherein the edge traversal criterion of the firewall rule for the target permits edge traversal via the virtual edge traversal interface of the host firewall, and wherein the re-injected payload satisfies the other firewall criteria of the firewall rule for the target.

17. A host computer that authorizes traffic received by the host computer within a local network, the host computer comprising:
a physical interface for receiving inbound traffic;
a target application; and
a host firewall that:
receives traffic transmitted from beyond an edge of the local network and destined for an edge traversal service within the host computer, the traffic including a payload destined for the target application;
authorizes the traffic to pass through the host firewall to the edge traversal service within the host computer, if the traffic is permitted by a firewall rule for the edge traversal service;
receives the payload at a virtual edge traversal interface of the host firewall, the payload being re-injected into the host firewall by the edge traversal service;
evaluates the re-injected payload against a firewall rule for the target application, the firewall rule for the target application including an edge traversal criterion identifying whether edge traversal is permitted and other firewall criteria identifying characteristics of permitted traffic; and
authorizes the re-injected payload to pass through the host firewall to the target application within the host computer, if the edge traversal criterion of the firewall rule permits edge traversal via the virtual edge traversal interface of the host firewall and the re-injected payload satisfies the other firewall criteria of the firewall rule for the target application.

18. The host computer of claim 17, wherein:
the host firewall blocks the re-injected payload from passing through the host firewall to the target application, if the edge traversal criterion for the target application does not permit edge traversal and the payload fails to satisfy all other firewall criteria of any firewall rule that includes an edge traversal criterion permitting edge traversal via the virtual edge traversal interface of the host firewall.

19. The host computer of claim 17 wherein:
the edge traversal service allows the host computer to receive unsolicited traffic through the edge of the local network;
the host firewall receives traffic including a packet that traversed the edge of the local network and that is destined for the edge traversal service, the packet encapsulating the payload destined for the target application within the host computer; and
the virtual edge traversal interface of the host firewall receives the payload after being decapsulated by the edge traversal service of the host computer.

20. The host computer of claim 17, wherein:
the edge traversal criterion of the firewall rule for the target application permits edge traversal via the virtual edge traversal interface of the host firewall,
the re-injected payload satisfies the other firewall criteria of the firewall rule for the target application, and
the host firewall passes the re-injected payload to the target application.

* * * * *